Dec. 31, 1968  J. W. MARTIN  3,418,852
DRIFT DROGUE
Filed April 28, 1967
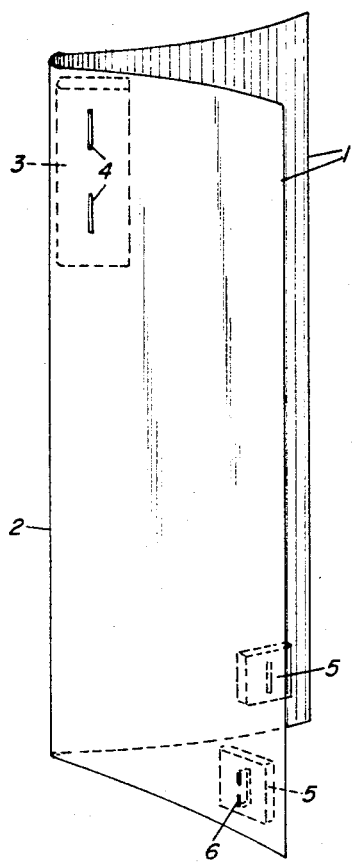
FIG.1
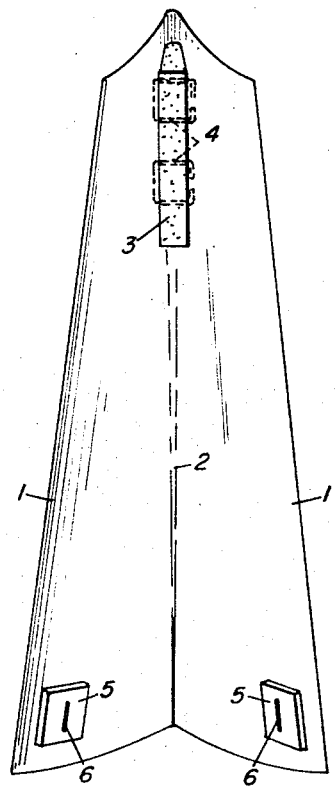
FIG.2
FIG.3
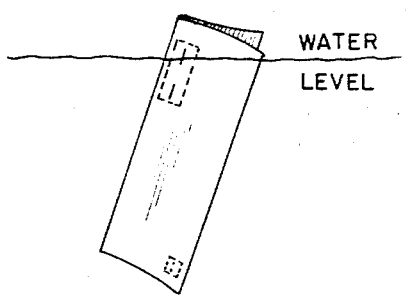
FIG.4
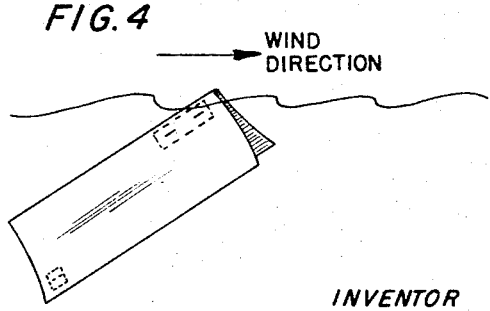
INVENTOR
JOHN W. MARTIN
BY Ernest P. Cohen
ATTORNEY

United States Patent Office 3,418,852
Patented Dec. 31, 1968

3,418,852
DRIFT DROGUE
John Wilson Martin, Auke Bay, Alaska, assignor to the United States of America as represented by the Secretary of the Interior
Filed Apr. 28, 1967, Ser. No. 635,957
9 Claims. (Cl. 73—189)

ABSTRACT OF THE DISCLOSURE

A drift drogue for charting surface currents of water bodies which consists of a winged structure having a float and weights so arranged as to provide a canted attitude to the drogue when it is immersed in water so that the ratio of wind resistance to water drag is reduced to a minimum.

Background of the invention

Drift drouges are recoverable markers used to chart the course and speed of water movement. They are used primarily for charting ocean surface currents and for charting the circulation of large masses of water such as inland lakes. The most familiar example of such drogues is the stoppered bottle with its enclosed card.

A typical study of water movement requires the release of a large number of individually identified drogues at a series of known locations. The drogues are allowed to drift freely with the currents. Recovery of the drogues and return of information concerning the location and time of their recovery depends entirely upon chance. The general public is usually relied upon to find the drogues along beaches, etc., and to return information to the organization or individual performing the study.

The percentage of drogues which are recovered depends upon a variety of factors, including the geography and population density of the shore area. For example, a much higher recovery rate would be expected along a shoreline having gentle beaches and high population density than could be expected along a rocky, sparcely inhabited coast. In practice, recovery rates sometimes are as low as 1 percent.

A practical drift drogue must be able to withstand exposure to a sea environment for an extended period of time, as long as 60 days or more, must resist breakage when washed upon shore, must resist beach sand scouring of identification marks and printing, must be relatively inexpensive, and must be conspicuous in appearance so as to invite recovery.

In order that the movement of the drogue accurately reflects surface currents a large component of water drag, relative to wind resistance, must be provided. The stoppered, glass bottle with its enclosed card has been found to be quite vulnerable to wind effects and has the additional disadvantage of often breaking when washed up on rocky beaches or cliffs. Another type of drogue, known as the Olson drift card, comprises an information return card sealed in a flat polyethylene envelope. Disadvantages of the Olson drift card include its susceptibility to wind effects and the puncturing of its plastic envelope either by bird attacks or by being washed up on rocks. The disadvantages of the Olson drift card and the design of a new card to overcome these disadvantages are discussed in an article by C. P. Duncan appearing in the Journal of Marine Research, volume 23, No. 3, pages 233–236, 1965. The Duncan card consists of a rectangle of relatively thick (3 mm.) polythene sheet stock having a message heat-embossed on its surface. While overcoming many of the disadvantages of the Olson card, the Duncan card remains unduly susceptible to wind effects.

The present invention provides a structure which largely overcomes the disadvantages of the drift drogues in use up to this time.

Accordingly, it is an object of this invention to provide an improved drift drogue.

It is a further object of this invention to provide a drift drogue which has an extremely small wind drag and a large component of water resistance so as to virtually eliminate wind effects from a study of surface currents.

Description of the invention

The invention will be more clearly understood from the following description of a preferred embodiment wherein reference is made to the accompanying drawings.

FIGURE 1 is a profile view of an assembled drift drogue.

FIGURE 2 is another view of the drogue showing the inner wing structure.

FIGURE 3 illustrates the attitude of the drogue when floating in calm water.

FIGURE 4 illustrates the attitude of the drogue under the influence of a strong wind.

Referring specifically to the drawings, the wings or flaps 1 are constructed of a moderately flexible, water impervious material. A plastic sheet whose surface is adapted to receive printing is preferred. Suitable plastics include polystyrene, polyethylene, polypropylene, polyvinylidene fluoride and the like. Materials such as a heavy paper impregnated with wax or plastic may also be used, but these materials are less satisfactory. The wings are most conveniently formed by bending a rectangle of plastic sheet stock in half along its center line so as to obtain a book-like configuration having a hinge or fold 2. The wings may also be constructed using two wing pieces appropriately joined with a hinge structure.

Flotation or buoyancy means 3 are attached between the inside surfaces of the two wings at a point near the top of the wings and adjacent to the hinge or fold. The flotation or buoyancy means performs two functions; it provides a positioned, positively buoyancy to the entire drogue and it restricts the movement of the wings thus preventing them from opening completely or reversing in the water. The buoyancy means preferably comprises a thin block or a closed-cell, foamed plastic such as foamed polystyrene. However, any material or structure affording a positive buoyancy in water can be used in place of the polystyrene foam. Thus, materials such as balsa wood or even a watertight metal can structure may be used for this purpose.

The buoyancy means can be attached securely to each of the wings, in a position between the wings, by any appropriate method. In the embodiment illustrated, flat, corrosion resistant staples 4 are used to attach the float to the wings. Waterproof adhesives which are compatible with the materials of construction have also been found to be satisfactory.

Weighting means 5 are attached to the lower corner of each of the wings in a position diagonally opposite the location of the buoyancy means. The weighting means may be attached either on the inside or the outside of the wings. It is preferred to attach the weights to the inside of the wings since this position affords the weights greater protection. The weighting means can comprise any appropriate material which has a density greater than that of water. Flat strips of a heavy metal such as lead are preferred. Thin strips of linotype spacing material have been found to be particularly convenient. The weighting means can be attached to the wings by any appropriate method. In the embodiment illustrated, flat, corrosion resistant staples 6 are used to attach the weights to the wings. Adhesives have also proven useful for the same purposes.

FIGURE 3 illustrates the normal attitude of the drogue when floating in calm water. The relationship between the flotation means and the weighting means is so adjusted as to expose only a small portion of the drogue to wind forces. In a calm sea, the axis between the flotation and weighting means is vertical which produces a tilted or canted attitude to the drogue structure. This canted alignment with the hinge or fold side of the wings higher than the open side insures proper orientation of the drogue with respect to the wind. The drogue will automatically orient itself so that the hinge or fold always faces into the wind thus presenting the least possible wind resistance.

FIGURE 4 illustrates the attitude of the drogue under the influence of a strong wind. The wind force tends to tilt the drogue so that the axis between the flotation means and weighting means is no longer vertical. This tilting is resisted by the weights and the net result is that the horizontal component of wind force on the drogue is changed in direction so as to act downwardly. In strong winds, the dorgue may completely submerge. The horizontal component of the wind force tends also to move the drogue through the water. This movement causes the flexible flaps to open, creating vastly increased water drag. These two effects in combination nearly neutralize the effect of wind on the movement of the drogue.

In the most preferred embodiment, the drogue wings are formed from a matte finished plastic sheet which has been dyed or pigmented a bright, fluorescent international orange, or other highly visible color.

Upon the outside of one wing is imprinted appropriate information concerning the drogue and the study being performed so as to encourage the finder to cooperate with the study. On the other wing is printed a reply questionnaire, in the form of a postal card, so as to enable the finder to conveniently furnish information concerning the recovery of the drogue. The boundaries of the postal card may comprise perforations (not shown) for ease in detaching it from the remainder of the wing structure. Positive identification of each individual drogue is accomplished by sequential numbering.

It will be understood that a number of variations and adaptations of the disclosed invention are possible without departing from its spirit or scope.

What is claimed is:
1. A drift drogue comprising two relatively flexible and relatively water impervious sheets secured on one edge so as to form a hinge, buoyancy means supported between and attached to said sheets at a point in close proximity to said hinge and near one end thereof and weighting means attached to each of said sheets at the end opposite said buoyancy means and at a greater distance from the hinge than said buoyancy means.
2. The device of claim 1 wherein said sheets comprise a single piece of material folded so as to form two symmetrical areas having an integral hinge.
3. The device of claim 2 wherein said single piece of material comprises a sheet whose surface is adapted to receive printing.
4. The device of claim 3 wherein said sheet comprises matte finished polystyrene.
5. The device of claim 1 wherein said buoyancy means comprise a block of foamed plastic having a closed cell structure.
6. The device of claim 5 wherein said foamed plastic is foamed polystyrene.
7. The device of claim 1 wherein said weighting means comprise flat strips of a heavy metal.
8. The device of claim 7 wherein said weighting means are attached to the inner side of said sheets at a point diagonally opposite said buoyancy means.
9. The device of claim 1 wherein the relationship between said buoyancy means and said weighting means is so adjusted as to alloy only a small portion of said drogue to provide above the water surface.

References Cited
FOREIGN PATENTS 119,730    7/1959    U.S.S.R.

RICHARD C. QUEISSER, *Primary Examiner.*

JERRY W. MYRACLE, *Assistant Examiner.*

U.S. Cl. X.R.

73—170